July 20, 1937.  W. SANDS  2,087,531
REAR VISION MIRROR
Filed Jan. 10, 1936   2 Sheets-Sheet 1
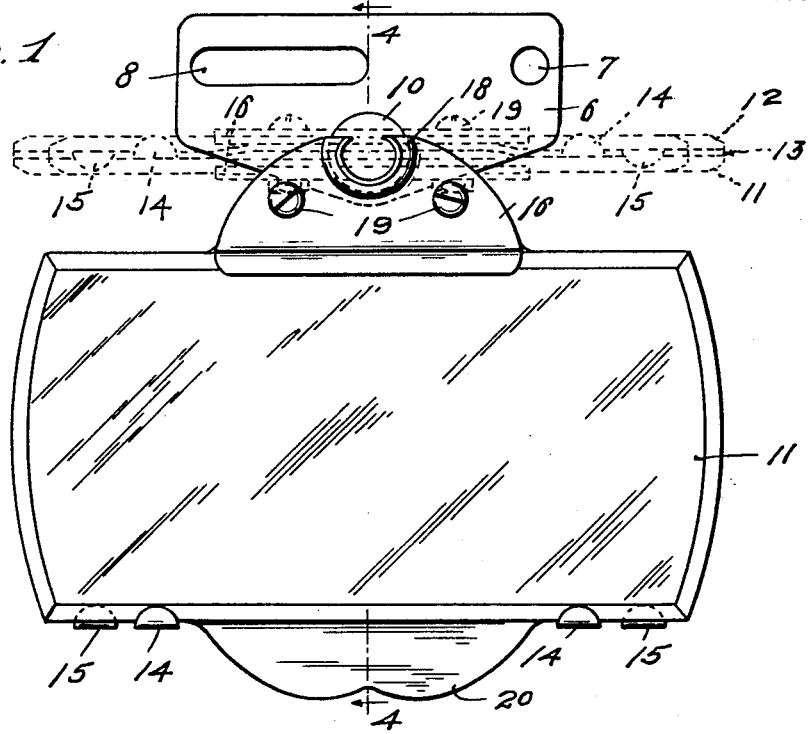
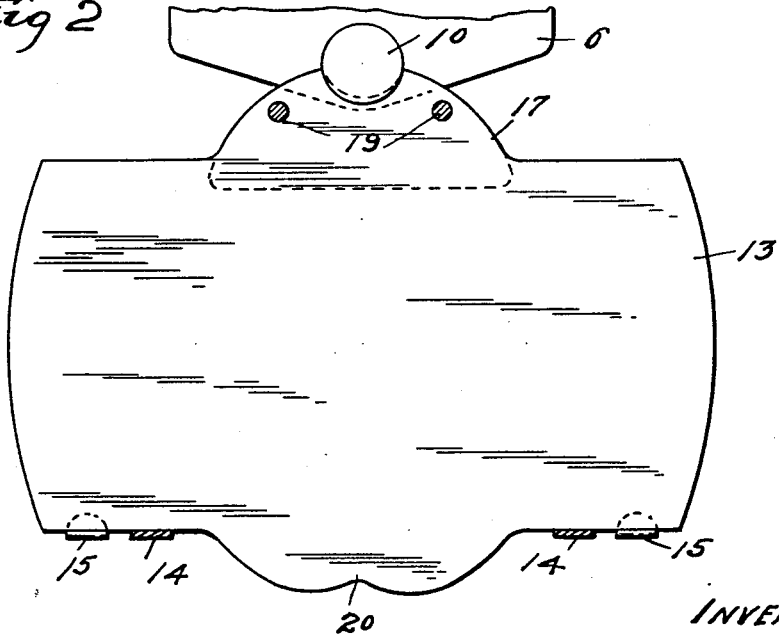
INVENTOR
WALTER SANDS
By his Attorneys.

July 20, 1937.　　　W. SANDS　　　2,087,531
REAR VISION MIRROR
Filed Jan. 10, 1936　　2 Sheets-Sheet 2
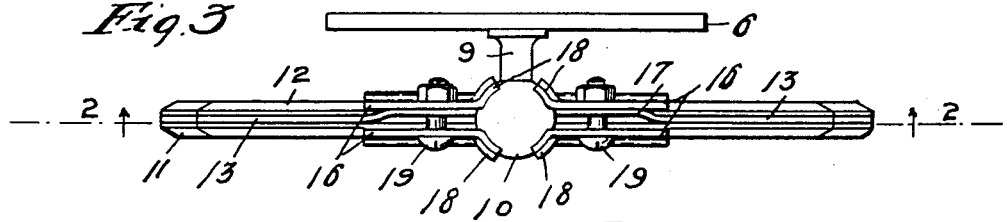
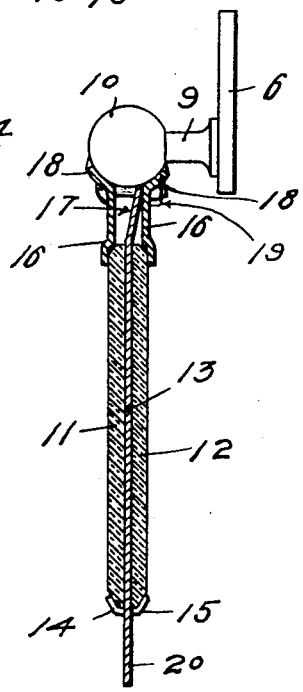
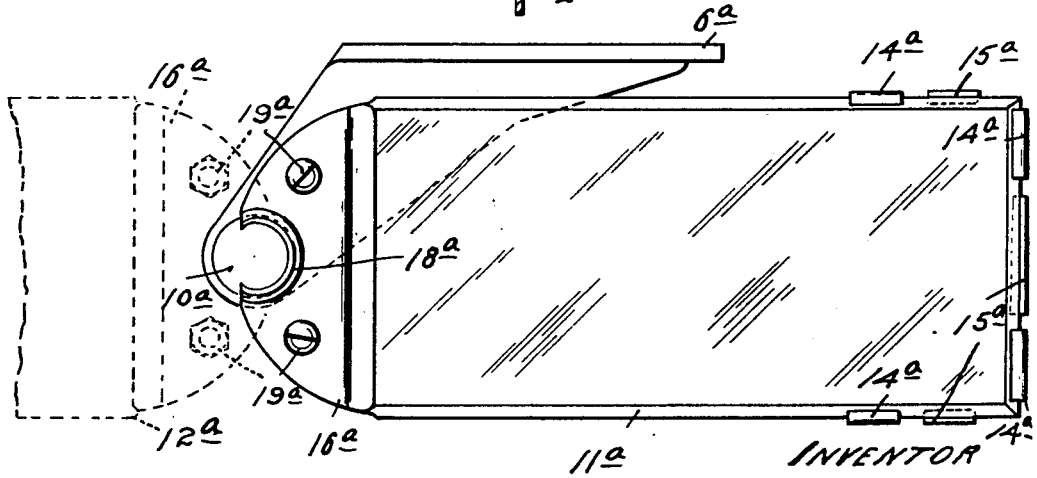
INVENTOR
WALTER SANDS
By his Attorneys
Merchant & Kilgore Patented July 20, 1937

2,087,531

UNITED STATES PATENT OFFICE 2,087,531

REAR VISION MIRROR

Walter Sands, Minneapolis, Minn.

Application January 10, 1936, Serial No. 58,518

14 Claims. (Cl. 88—77)

My present invention relates to mirrors of a general type used in connection with automobiles, and generally referred to as rear vision mirrors, and which have interchangeable relatively bright and dark reflecting surfaces; but mirrors of this type, it will be understood, are capable of more general use. Such mirrors quite frequently have relatively bright and dark mirrors secured back to back by a support adapting either of the surfaces to be exposed to view.

My invention provides an improved holding and supporting means for the mirror panels, the novelty of which consists: (a) in extremely simple and highly efficient means for holding the mirror panels together back to back; and (b) a novel supporting device for permitting the relatively bright and dark reflecting surfaces to be quickly and easily shifted from exposed to unexposed positions.

The novel supporting means involves a universal joint (a ball and socket joint), the center of which is offset from one edge of the reflecting surface or mirror, and is located approximately in the plane of the reflecting surface or mirror. Of course, when two mirror panels are placed back to back, the reflecting surfaces will be slightly spaced and the center of the universal joint should then be in a plane that is slightly between the reflecting surfaces; but in such an arrangement, the center of the said joint will be approximately in the plane of the mirrors.

This relative arrangement of the universal or ball and socket joint in respect to the mirrors is, as will presently appear, highly important and makes possible quick adjustments of the mirrors by very simple movements. Also the invention involves a structure in which vibration of the mirrors on the ball and socket or universal joint is prevented.

The invention is illustrated in the accompanying drawings, wherein like characters indicate like parts throughout the several views.

Referring to the drawings:

Fig. 1 is a front elevation showing the mirror assembly, that is, the complete mirror structure including its support;

Fig. 2 is a view corresponding to Fig. 1, but with one of the mirror panels removed;

Fig. 3 is a plan view of the parts shown in Fig. 1;

Fig. 4 is a section taken on the line 4—4 of Fig. 1; and

Fig. 5 is a front elevation showing a modified form of the mirror assembly.

Referring to the structure illustrated in Figs. 1 to 4, inclusive, the numeral 6 indicates an anchoring bracket or plate adapted to be secured to a suitable front portion of the automobile, and for which purpose it is shown as provided with a screw hole 7 and a slot 8. This anchor 6 is provided with a projecting neck 9 that terminates in a ball or spherical head 10, which latter element forms a part of the ball and socket or universal joint.

As already indicated, the mirror assembly includes a pair of mirror panels 11 and 12, preferably and as shown, of beveled glass. These mirror panels are preferably of the same outline and it will be assumed that the panel 11 has a bright reflecting surface and that the panel 12 has a dark or nearly black reflecting background or surface. These two panels are placed back to back against a thin metal carrier plate or frame 13, which, at its lower edge, has reversely bent clinching lips 14 and 15, respectively, bent to the right and to the left in respect to Fig. 4, so that the lips 14 overlap the lower edge of the mirror panel 11, and the lips 15 overlap the lower edge of the panel 12.

To engage the upper edges of the panels 11 and 12 and clamp the same against the plate 13 and to form socket elements to engage the ball 10, there is provided a pair of reversely opposed clamping plates 16. Here it may be noted that the carrier plate 13 is provided with an upwardly projected flange 17 located between the clamping plates 16 and obliquely turned so as to engage the ball 10 at a point offset from the plane of the body of the plate 13, and the body of which plate lies in a plane that intersects the center of the ball 10. The purpose of this will hereinafter appear.

The clamping plates 16 are formed with segmental socket-forming flanges 18 that are spherically concave to fit the surface of the ball 10. These socket-forming flanges 18 extend through more than 180 degrees, but are formed with gaps that are wider than the neck 9, see particularly Figs. 3 and 4. Nut-equipped bolts 19 are passed through perforations in the clamping plates 16 and in the flange 17 of the carrier plate and, when tightened, not only clamp the plates 16 against the edges of the mirror panels, but press the segmental socket flanges 18 into tight frictional contact with the ball 10, and, moreover, press the edge of the flange 17 against the said ball 10. By this simple means, the mirror panels are secured to the carrier plate and the panels, in their immediate support, are secured to the ball free from vibrations, but under such limited friction that the mirror may be freely adjusted in a manner presently to be described.

Preferably, the carrier plate 13 is provided at its lower edge with a depending portion 20, that is adapted to be engaged to impart the various adjustments to the mirrors or to set the same at the proper angle in respect to the eyes of the driver of the car to which the rear vision mirror has been applied.

It will be assumed that the mirrors have been set as shown in Figs. 1, 3 and 4, with the bright surface mirror 11 exposed to the view of the driver, which is a condition desirable for daytime driving. For night driving, as is well known, the dark surface mirror should be exposed to view for the reason that it does not produce a blinding effect in the eyes of the driver when the headlight of a car at the rear is projected against the same. The above noted arrangement of the ball and socket or universal joint permits the adjustments to expose, at will, either of the reflecting mirrors in a novel manner, which may be accomplished in either of two ways, to wit:

*Illustration No. 1*

From the position shown in the drawings, turn the mirrors vertically upward on the ball through 180 degrees. This movement is permitted because the gaps in the socket flanges 18 will clear the neck 9. This movement will then expose the dark reflecting mirror but it will be out of position or too high up for the proper vision. Next, however, the mirror will be rotated on the ball in the plane of the mirrors through 180 degrees, which will bring the dark reflecting surface back to the position previously occupied by the bright reflecting mirror.

*Illustration No. 2*

From the position shown in the drawings, Figs. 1, 2, 3 and 4, turn the mirrors forward into a horizontal position or through 90 degrees, which brings the mirrors substantially or nearly into a plane with the axis of the neck 9 (or at least near enough to that position to bring the gaps in the socket members 18 in line with the neck 9), and then with a swivelling action, rotate the mirrors around the axis of the neck 9 through 180 degrees; and then turn the mirror back to the proper original position with the dark mirror exposed to the view of the driver.

It will thus be seen that the location of the center of the ball or universal joint substantially in or close to the plane or planes of the reflecting surface, is important and is what permits the above described simple reversing movement and sets the interchangeably usable reflecting surfaces always in the proper line of vision.

The mirror structure illustrated in Fig. 5 is substantially like that illustrated in Figs. 1 to 4, inclusive, except that the ball and socket joint is offset at one end of the mirror panels and hence parts of this structure that correspond closely to the structure previously described, are indicated by the same numerals with the added exponent *a*. For example, the said parts may be briefly noted as follows: The supporting bracket 6a; the ball 10a; the mirror panels, only one of which, to wit: the bright panel 11a is shown; the carrier plate which is hidden from view, but which is provided with the clinching lips 14a and 15a; the clamping plates 16a with segmental socket-forming flanges 18a; and the nut-equipped bolts 19a.

The manner of adjusting the mirror structure illustrated in Fig. 5 is substantially the same as that previously described in connection with Figs. 1 to 4, inclusive.

From the foregoing, it is evident that the device described is capable of modifications as to details of structure and arrangement of parts within the scope of the invention herein disclosed and claimed.

What I claim is:

1. A mirror assembly comprising a carrier plate, two mirrors, and a pair of clamping plates, said carrier plate having reversely bent clenching-lips engaging the lower edges of said mirrors, said clamping plates being engaged with the opposite edges of said mirrors, said clamping plates having segmental socket-forming flanges, a support for said assembly having a projecting neck terminating in a ball-like head, said socket forming flanges being frictionally clamped on said head, the gaps in said socket flanges being wide enough to pass said neck therethrough, the center of the ball and socket joint formed by said head and socket flanges being offset from the upper edges of the mirrors and approximately in the plane of said carrier plate.

2. A mirror assembly comprising a carrier plate, a pair of mirrors disposed one on each side of said plate, means on the lower portion of said plate engaging the lower edges of said mirrors, clamping plates engaging the upper portions of said mirrors and formed with segmental socket-forming flanges, bolts passed through said clamping plates, and a support, including a neck, terminating in a ball-like head seated in said socket flanges, the gaps in said flanges being wide enough to pass said neck therethrough.

3. The structure defined in claim 2 in which said carrier plate is provided with an upper portion frictionally held against said ball-like head by said bolts and clamping plates.

4. The structure defined in claim 2 in which said carrier plate at the edge opposite to said socket-forming flanges projects beyond the mirrors to afford a flange that is to be engaged by the hand to adjust the mirrors.

5. The structure defined in claim 2 in which said carrier plate between said clamping plates is provided with a projecting flange formed to engage said ball-like head and through which said bolts are passed.

6. The structure defined in claim 2 in which said carrier plate between said clamping plates is provided with a projecting flange formed to engage said ball-like head and through which said bolts are passed, said carrier plate at the edge opposite this head-engaging flange projecting beyond the mirrors to afford a flange that is to be engaged by the hand to adjust the mirrors.

7. A mirror assembly comprising a mirror structure having two faces, the one differing from the other in respect to reflective action, a carrier located between said reflecting surfaces and having means for supporting said mirror structure, clamping plates applied to one edge of said mirror structure, said clamping plates being provided with segmental socket-forming flanges for frictional engagement with the ball-like head of a supporting neck, said socket-forming flanges being offset from the adjacent edge of the mirror carrier, approximately in the plane of the mirror structure, said socket-forming flanges having gaps adapted to pass the supporting neck therethrough.

8. The structure defined in claim 7 in which said mirror carrier, at the edge opposite said clamping plates, has a projecting flange adapted to be engaged to adjust the mirror structure.

9. A mirror structure comprising an anchoring base having a projecting neck terminating in a ball-like head, a pair of mirrors assembled back to back, a carrier located between said mirrors and having means for supporting said mirrors thus assembled, and a pair of clamping plates applied to one edge of the mirror assembly and provided with segmental socket-forming flanges, frictionally engaging said ball-like head, with the center of said head offset from the adjacent edges of the mirrors, approximately in the plane of said carrier, said socket-forming flanges having gaps that are wide enough to pass said neck therethrough.

10. A mirror assembly comprising an anchoring base having a projecting neck terminating in a ball-like head, a pair of mirrors assembled back to back, a carrier plate interposed between said mirrors and having means for holding means engaging said mirrors, and a pair of clamping plates applied to one edge of said carrier plate and to the adjacent edges of said mirrors, said clamping plates being provided with segmental socket-forming flanges frictionally engaging said ball-like head with the center of said head offset from the adjacent edges of said mirrors, approximately in the plane of said carrier plate, the gaps in said socket-forming flanges being wide enough to pass said neck therethrough.

11. The structure defined in claim 10 in which said carrier, at the edge opposite said socket-forming flanges, is provided with a projecting flange for engagement to adjust the mirror structure without engagement of the mirror surfaces.

12. The combination of a pair of mirrors assembled back to back, a carrier plate therefor, located between the same and projecting from one edge thereof, and socket-forming members located one on each side of the projecting portion of said carrier plate and anchored thereto, said socket-forming members having clamping portions that engage said mirrors and position the socket-forming portions offset from the mirrors with the axis of the socket approximately in the plane of said carrier plate.

13. A mirror assembly comprising an anchoring base having a projecting neck terminating in a ball-like head, a pair of mirrors assembled back to back, a carrier plate interposed between said mirrors and projecting therefrom at one edge, and a pair of socket-forming members applied to said ball-like head and located one on each side of the projecting portion of said carrier plate and anchored thereto, said ball-like head being seated in the socket formed by said socket-forming members.

14. The structure defined in claim 13 in which the projecting edge of said carrier plate is frictionally engaged with said ball-like head to assist in holding the mirror structure where set.

WALTER SANDS.